(12) United States Patent
Schipper et al.

(10) Patent No.: US 12,106,542 B2
(45) Date of Patent: Oct. 1, 2024

(54) TARGETS FOR TRACKING, AND SYSTEMS AND METHODS FOR TRACKING THE TARGETS

(71) Applicant: INTELLIJOINT SURGICAL INC., Kitchener (CA)

(72) Inventors: Joseph Arthur Schipper, Kitchener (CA); Ryan Visee, Mississauga (CA); Andre Novomir Hladio, Waterloo (CA)

(73) Assignee: Intellijoint Surgical Inc., Kitchener (CA)

( * ) Notice: Subject to any disclaimer, the term of this patent is extended or adjusted under 35 U.S.C. 154(b) by 389 days.

(21) Appl. No.: 17/688,848

(22) Filed: Mar. 7, 2022

(65) Prior Publication Data

US 2022/0292807 A1    Sep. 15, 2022

Related U.S. Application Data

(60) Provisional application No. 63/158,491, filed on Mar. 9, 2021.

(51) Int. Cl.
*G06V 10/48* (2022.01)
*G06T 7/20* (2017.01)
*G06T 7/70* (2017.01)

(52) U.S. Cl.
CPC .............. *G06V 10/48* (2022.01); *G06T 7/20* (2013.01); *G06T 7/70* (2017.01); *G06V 2201/07* (2022.01)

(58) Field of Classification Search
CPC .. G06V 10/48; G06V 2201/07; G06V 10/245; G06V 2201/034; G06T 7/20; G06T 7/70; G06T 2207/20061; G06T 2207/30204; G06T 7/246
See application file for complete search history.

(56) References Cited

U.S. PATENT DOCUMENTS

| | | | | |
|---|---|---|---|---|
| 8,988,505 B2 * | 3/2015 | Schaerer | ................ | A61B 90/96 348/46 |
| 2019/0073777 A1 * | 3/2019 | Lee | ......................... | G06T 7/246 |

* cited by examiner

*Primary Examiner* — Said M Elnoubi

(57) ABSTRACT

Described are targets for use in optical tracking, as well as related methods. In some implementations, a target comprises a planar surface with an optically detectable pattern thereon, and at least one protrusion extending from the planar surface. In other implementations, a target comprises a planar surface with an optically detectable pattern thereon, with a specular reflective region. The optically detectable pattern provides accurate position information of the target, and provides accurate orientation information of the target about a first axis, but may not provide accurate orientation information of the target about other axes. The at least one protrusion or the specular reflective region provide accurate information of orientation of the target, particularly orientations about axes other than the first axis.

20 Claims, 7 Drawing Sheets

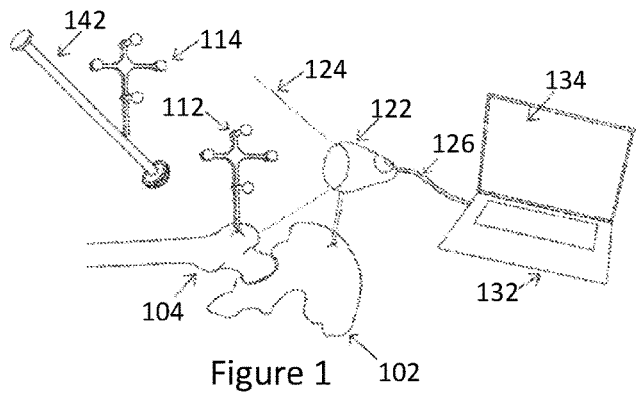
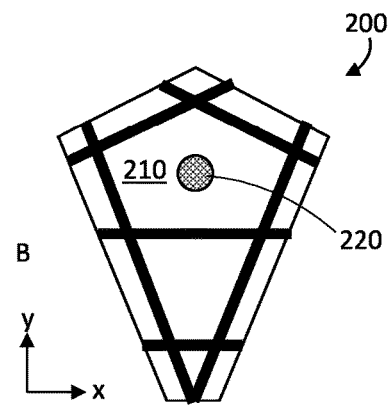
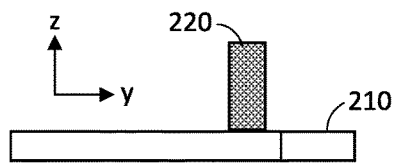
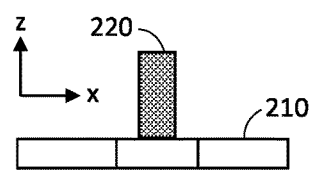
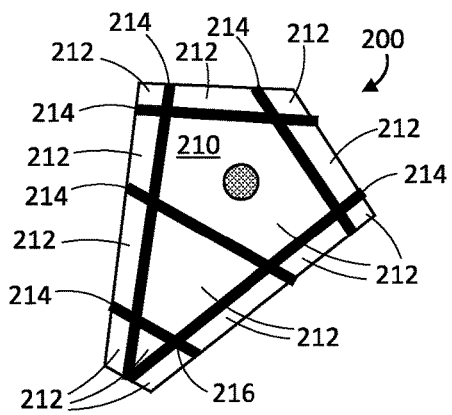
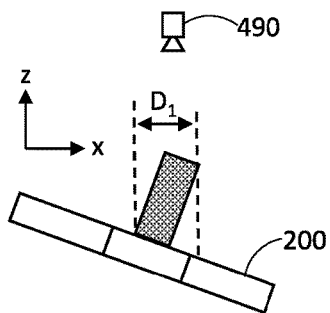
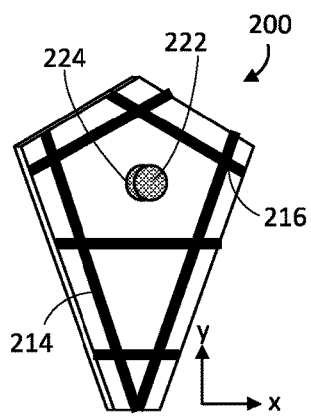
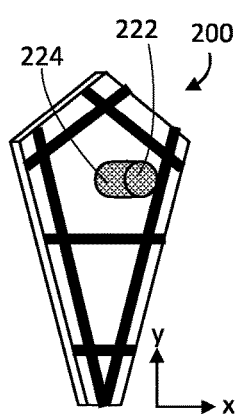
Figure 1
Figure 2A
Figure 2B
Figure 2C
Figure 3
Figure 4A
Figure 4B
Figure 4C

TARGETS FOR TRACKING, AND SYSTEMS AND METHODS FOR TRACKING THE TARGETS

CROSS-REFERENCE

The present application claims a benefit of U.S. Provisional Application No. 63/158,491 filed Mar. 9, 2021, the entire contents of which are incorporated herein by reference.

FIELD OF THE INVENTION

The present disclosure relates to surgical tracking, and in particular relates to targets used in tracking, as well as methods for using such targets.

BACKGROUND

During a procedure, such as a surgical procedure, it can be desirable to register, detect, localize, and/or track various elements. Such elements include, for example, anatomy of a patient, or tools used during the surgery. Such tracking entails positioning a target having predetermined geometry on the element to be tracked, capturing image data representing the target, and determining a pose (position and orientation) of the target, or of the element relative to the target by a tracking system.

Existing targets have limited effectiveness at indicating rotation out of a plane viewed by an image sensor.

The targets and methods described herein are not limited to surgical applications, but rather can be used in any appropriate application.

SUMMARY

Described are targets for use in optical tracking, as well as related methods. In some implementations, a target comprises a planar surface with an optically detectable pattern thereon, and at least one protrusion extending from the planar surface. In other implementations, a target comprises a planar surface with an optically detectable pattern thereon, with a specular reflective region. The optically detectable pattern provides accurate position information of the target, and provides accurate orientation information of the target about a first axis, but may not provide accurate orientation information of the target about other axes. The at least one protrusion or the specular reflective region provide accurate information of orientation of the target, particularly orientations about axes other than the first axis.

According to a broad aspect, the present disclosure describes a target for use in optical tracking, the target comprising: a planar surface having an optically detectable pattern thereon, the optically detectable pattern to identify a position of the target and an orientation of the target about a first axis perpendicular to the planar surface; and at least one optically detectable protrusion extending from the planar surface, the at least one protrusion to identify an orientation of the target about a second axis perpendicular to the first axis.

The optically detectable pattern may comprise a first set of regions and a second set of regions, the first set of regions contrasting with the second set of regions. The first set of regions may be configured to appear with a first brightness; and the second set of regions may be configured to appear with a second brightness, wherein the first brightness is higher than the second brightness. The first set of regions may include a plurality of lines which extend along the planar surface. The second set of regions may include a plurality of lines which extend along the planar surface. The first set of regions may comprise reflective or retroreflective material, and the second set of regions may comprise non-reflective or light-absorptive material. The first set of regions may comprise translucent diffuse material, and the second set of regions may comprise opaque material. The target may further comprise at least one light source to emit light through the first set of regions.

The at least one protrusion may be configured to appear with the first brightness. The at least one protrusion may be configured to appear with the second brightness. The target may comprise a cartridge insertable into a mask unit, the mask unit comprising the second set of regions, the mask unit covering select regions of the cartridge to define the first set of regions as uncovered regions of the cartridge.

The at least one protrusion may identify an orientation of the target about a third axis perpendicular to the first axis and non-parallel to the second axis. The at least one protrusion may include at least two protrusions. Each protrusion of the at least two protrusions may extend from the planar surface to a different extent. Each protrusion of the at least two protrusions may be indicative of an orientation of the target within a respective angular range, each respective angular range being different from each other. Each protrusion of the at least one protrusion may includes a respective tip at an end of thereof distal from the planar surface, the tip having a diameter larger than a diameter of the respective protrusion. The at least one protrusion may extend perpendicular to the planar surface. The at least one protrusion may include at least one cylindrical post. The at least one protrusion may include at least one post having a prism-shaped cross-section. The at least one protrusion may be configured to occlude a portion of the planar surface based on an orientation of the target about the second axis, and wherein a shape of occlusion of the planar surface by the protrusion identifies the orientation of the target about the second axis.

According to another broad aspect, the present disclosure describes a computer implemented method of tracking a target, the target having a planar surface with an optically detectable pattern thereon, and at least one optically detectable protrusion extending from the planar surface, the method comprising: receiving image data including a representation of the target; identifying the optically detectable pattern on the planar surface as represented in the image data; identifying a shape of the at least one protrusion as represented in the image data; determining a position of the target and an orientation of the target about a first axis perpendicular to the planar surface based on relative position and orientation of the identified optically detectable pattern; and determining an orientation of the target about a second axis perpendicular to the first axis based on the shape of the at least one protrusion as represented in the image data.

The optically detectable pattern on the planar surface may include a plurality of lines which run along the planar surface, and identifying the optically detectable pattern on the planar surface may comprise performing line detection to at least partially identify the plurality of lines. The method may further comprise determining intersection points between identified lines, and determining a position of the target and an orientation of the target about the first axis may include determining the position of the target and the orientation of the target about the first axis based on relative position and orientation of the intersection points. Performing line detection may include filtering identified line candidates based on expected line position. Performing the line detection may comprise performing a Standard Hough Transform (SHT).

The at least one protrusion may include at least two protrusions, and determining an orientation of the target about the second axis may be based on the shape of at least one protrusion of the at least two protrusions as represented in the image data. Each protrusion of the at least two protrusions may extend from the planar surface to a different extent, and determining an orientation of the target about the second axis may be based on: the shape of a first protrusion of the at least two protrusions as represented in the image data when the orientation of the target about the second axis is within a first angular range; or the shape of a second protrusion of the at least two protrusions as represented in the image data when the orientation of the target about the second axis is within a second angular range different from the first angular range.

Each protrusion of the at least one protrusion may include a respective tip at an end of thereof distal from the planar surface, the tip having a larger diameter than a diameter of the respective protrusion, and determining an orientation of the target about the second axis may be based on a position or shape of at least one respective tip as represented in the image data.

Determining an orientation of the target about a second axis perpendicular to the first axis may comprise comparing the shape of the at least one protrusion as represented in the image data to a known geometry of the at least one protrusion. Identifying a shape of the at least one protrusion as represented in the image data may comprise performing edge detection to identify a boundary of the protrusion as represented in the image data. The method may further comprise, prior to identifying the optically detectable pattern, performing binarization of the image data to identify bright regions and dark regions in the image data based on a brightness threshold. The method may further comprise determining an orientation of the target about a third axis perpendicular to the first axis and non-parallel to the first axis based on the shape of the at least one protrusion as represented in the image data. Determining an orientation of the target about a second axis perpendicular to the first axis based on a shape of the at least one protrusion as represented in the image data may comprise determining an orientation of the target about the second axis based on a shape of a portion of the planar surface occluded by the at least one protrusion.

According to another broad aspect, the present disclosure describes an optical tracking system comprising: a target, the target including: a planar surface having an optically detectable pattern thereon; and at least one optically detectable protrusion extending from the planar surface; an image sensor to capture image data including at least one representation of the target; and a processing unit configured to perform any of the methods described herein.

According to another broad aspect, the present disclosure describes an optical tracking system comprising: a target, the target including: a planar surface having an optically detectable pattern thereon; and at least one optically detectable protrusion extending from the planar surface; an image sensor to capture image data including at least one representation of the target; and a processing unit to: receive the image data from the image sensor; identify the optically detectable pattern on the planar surface as represented in the image data; identify a shape of the at least one protrusion as represented in the image data; determine a position of the target and an orientation of the target about a first axis perpendicular to the planar surface based on relative position and orientation of the identified optically detectable pattern; and determine an orientation of the target about a second axis perpendicular to the first axis based on the shape of the at least one protrusion as represented in the image data.

The optically detectable pattern may comprise a first set of regions and a second set of regions, the first set of regions contrasting with the second set of regions. The first set of regions may be configured to appear with a first brightness; and the second set of regions may be configured to appear with a second brightness, wherein the first brightness is higher than the second brightness. The first set of regions may include a plurality of lines which extend along the planar surface. The second set of regions may include a plurality of lines which extend along the planar surface. The processing unit may identify the optically detectable pattern by performing line detection to at least partially identify the plurality of lines. The processing unit may determine intersection points between identified lines, and to determine the position of the target and the orientation of the target about the first axis based on relative position and orientation of the intersection points. The first set of regions may comprise reflective or retroreflective material, and the second set of regions may comprise non-reflective or light-absorptive material. The first set of regions may comprise translucent diffuse material, and the second set of regions may comprise opaque material. The optical tracking system may further comprise at least one light source to emit light through the first set of regions.

The at least one protrusion may be configured to appear with the first brightness. The at least one protrusion may be configured to appear with the second brightness. The target may comprise a cartridge insertable into a mask unit, the mask unit comprising the second set of regions, the mask unit covering select regions of the cartridge to define the first set of regions as uncovered regions of the cartridge. The processing unit may determine an orientation of the target about a third axis perpendicular to the first axis and non-parallel to the second axis based on the shape of the at least one protrusion as represented in the image data.

The at least one protrusion may include at least two protrusions. Each protrusion of the at least two protrusions may extend from the planar surface to a different extent. Each protrusion of the at least two protrusions may be indicative of an orientation of the target within a respective angular range, each respective angular range being different from each other. Each protrusion of the at least one protrusion may include a respective tip at an end of thereof distal from the planar surface, the tip having a diameter larger than a diameter of the respective protrusion.

A geometry of the at least one protrusion may be provided to the processing unit, and determining an orientation of the target about a second axis perpendicular to the first axis may comprise comparing the shape of the at least one protrusion as represented in the image data to the known geometry. The known geometry may include an extent to which the at least one protrusion extends from the planar surface. The at least one protrusion may extend perpendicular to the planar surface. The at least one protrusion may include at least one cylindrical post. The at least one protrusion may include at least one post having a prism-shaped cross-section. The at least protrusion may be configured to occlude a portion of the planar surface based on an orientation of the target about the second axis, and the processing unit may identify a shape of occlusion of the planar surface by the protrusion to determine the orientation of the target about the second axis.

According to another broad aspect, the present disclosure describes a target for use in optical tracking, the target comprising: a planar surface having an optically detectable pattern thereon, the optically detectable pattern to identify a position of the target and an orientation of the target about a first axis perpendicular to the planar surface; and at least one specular reflective region extending along the planar surface, the reflective region to indicate an orientation of the target about a second axis perpendicular to the first axis based on specular reflection from the reflective region.

The at least one specular reflective region may comprise a continuous reflective strip extending partially across the planar surface. The at least one specular reflective region may comprise a continuous reflective strip extending from a first edge of the planar surface to a second edge of the planar surface.

The at least one specular reflective region may comprise: a first specular reflective region extending along the planar surface in a first direction perpendicular to the second axis, to indicate orientation of the target about the second axis; and a second specular reflective region extending along the planar surface in a second direction non-parallel to the first direction, to indicate orientation about a third axis perpendicular to the second direction.

The at least one specular reflective region may comprise a specular reflective area extending along the planar surface in both a first direction and a second direction perpendicular to the first direction, to indicate orientation of the target about the second axis perpendicular to the first direction and about a third axis perpendicular to the second direction.

The target may further comprise a curved protrusion extending from the planar surface, at least a portion of the specular reflective region positioned on the curved protrusion. The curved protrusion may have a partially cylindrical shape, and the specular reflective region may comprise a reflective strip positioned on a curved surface of the partially cylindrical shape. The curved protrusion may have a dome shape, and the specular reflective region may be positioned to extend along a surface of the dome shape.

The optically detectable pattern may comprise a first set of regions and a second set of regions, the first set of regions contrasting with the second set of regions. The first set of regions may be configured to appear with a first brightness; and the second set of regions may be configured to appear with a second brightness, wherein the first brightness is higher than the second brightness. The first set of regions may comprise reflective or retroreflective material, and the second set of regions may comprise non-reflective or light-absorptive material. The first set of regions may comprise translucent diffuse material, and the second set of regions may comprise opaque material. The target may comprise a cartridge insertable into a mask unit, the mask unit comprising the second set of regions, the mask unit covering select regions of the cartridge to define the first set of regions as uncovered regions of the cartridge.

The at least one specular reflective region may comprise a plurality of specular reflective regions positioned along the planar surface, to indicate an orientation of the target about a second axis based on which specular reflective region of the plurality of specular reflective regions is producing specular reflection.

According to another broad aspect, the present disclosure describes a computer implemented method of tracking a target, the target having a planar surface with an optically detectable pattern thereon, and at least one specular reflective region extending along the planar surface, the method comprising: receiving image data including a representation of the target; identifying features of the optically detectable pattern as represented in the image data; determining a position of the target and an orientation of the target about a first axis perpendicular to the planar surface based on relative position and orientation of the identified features; identifying a position of specular reflection from the at least one specular reflective region; and determining an orientation of the target about a second axis perpendicular to the first axis based on the position of the specular reflection.

The method may further comprise determining an expected position of the specular reflective region based on the relative position and orientation of the identified features, and identifying specular reflection from the at least one specular reflective region may comprise analyzing a portion of the image data corresponding to the expected position of the specular reflective region to identify specular reflection therefrom. Identifying specular reflection from the at least one specular reflective region may comprise identifying a peak light intensity along the expected position of the specular reflective region.

The at least one specular reflective region may include a first specular reflective region extending along the planar surface in a first direction perpendicular to the second axis and a second specular reflective region extending along the planar surface in a second direction non-parallel to the first direction; determining an orientation of the target about the second axis may comprise determining an orientation of the target about the second axis based on a position of specular reflection from the first specular reflective region; and the method may further comprise determining an orientation of the target about a third axis perpendicular to the second direction based on a position of specular reflection from the second specular reflective region.

The at least one specular reflective region may comprise a specular reflective area extending along the planar surface in a first direction and in a second direction perpendicular to the first direction; determining an orientation of the target about a second axis may comprise determining an orientation of the target about the second axis based on a position of specular reflection from the specular reflective region in the first direction; and the method may further comprise determining an orientation of the target about a third axis perpendicular to the first axis and the second axis based on a position of specular reflection from the specular reflective region in the second direction.

The at least one specular reflective region may comprise a plurality of specular reflective regions, positioned along the planar surface, and determining an orientation of the target about a second axis may comprise determining an orientation of the target about the second axis based on which specular reflective region of the plurality of specular reflective regions is producing specular reflection.

The method may further comprise, prior to identifying features of the optically detectable pattern, performing binarization of the image data to identify bright regions and dark regions in the image data based on a brightness threshold.

According to another broad aspect, the present disclosure describes an optical tracking system comprising: a target, the target including: a planar surface having an optically detectable pattern thereon; and at least one specular reflective region extending along the planar surface; an image sensor to capture image data including at least one representation of the target; and a processing unit configured to perform any of the methods described herein.

According to another broad aspect, the present disclosure describes an optical tracking system comprising: a target, the target including: a planar surface having an optically detectable pattern thereon; and at least one specular reflective region extending along the planar surface; a light source to emit light to illuminate the target; an image sensor proximate to the light source, the image sensor to capture image data including at least one representation of the target; and a processing unit to: receive the image data from the image sensor; identify features of the optically detectable pattern as represented in the image data; determine a position of the target and an orientation of the target about a first axis perpendicular to the planar surface based on relative position and orientation of the identified features; identifying a position of specular reflection of the light from the at least one specular reflective region; determining an orientation of the target about a second axis perpendicular to the first axis based on the position of the specular reflection.

The at least one specular reflective region may comprise a continuous reflective strip extending partially across the planar surface. The at least one specular reflective region may comprise a continuous reflective strip extending from a first edge of the planar surface to a second edge of the planar surface.

The at least one specular reflective region may comprise: a first specular reflective region extending along the planar surface in a first direction perpendicular to the second axis, the processing unit to determine orientation of the target about the second axis based on a position of specular reflection from the first specular reflective region; and a second specular reflective region extending along the planar surface in a second direction non-parallel to the first direction, the processing unit to determine orientation of the target about a third axis perpendicular to the second direction.

The at least one specular reflective region may comprise a specular reflective area extending along the planar surface in both a first direction and a second direction perpendicular to the first direction, the processing unit to determine orientation of the target about the second axis perpendicular to the first direction based on a position of specular reflection from the specular reflective region in the first direction, and the processing unit to determine orientation of the target about a third axis perpendicular to the second direction based on a position of specular reflection from the specular reflective region in the second direction.

The target may further comprise a curved protrusion extending from the planar surface, at least a portion of the specular reflective region positioned on the curved protrusion. The curved protrusion may have a partially cylindrical shape, and the specular reflective region may comprising a reflective strip positioned on a curved surface of the partially cylindrical shape.

The curved protrusion may have a dome shape, and the specular reflective region may be positioned to extend along a surface of the dome shape.

The optically detectable pattern may comprise a first set of regions and a second set of regions, the first set of regions contrasting with the second set of regions. The first set of regions may be configured to appear with a first brightness; and the second set of regions may be configured to appear with a second brightness, wherein the first brightness is higher than the second brightness. The first set of regions may comprise reflective or retroreflective material, and the second set of regions may comprise non-reflective or absorptive material. The first set of regions may comprise translucent diffuse material, and the second set of regions may comprise opaque material. The target may comprise a cartridge insertable into a mask unit, the mask unit comprising the second set of regions, the mask unit covering select regions of the cartridge to define the first set of regions as uncovered regions of the cartridge.

The processor may determine an expected position of the specular reflective region based on the relative position and orientation of the identified features, and identify specular reflection from the at least one specular reflective region by analyzing only a portion of the image data corresponding to the expected position of the specular reflective region. The processing unit may identify specular reflection from the at least one specular reflective region by identifying a peak light intensity along the expected position of the specular reflective region.

The at least one specular reflective region may comprise a plurality of specular reflective regions positioned along the planar surface, wherein the processing unit is configured to determine an orientation of the target about the second axis based on which specular reflective region of the plurality of specular reflective regions is producing specular reflection.

BRIEF DESCRIPTION OF THE FIGURES

FIG. 1 illustrates an exemplary scenario in which targets described herein can be used.

FIG. 2A is a front view of an exemplary target featuring an optically detectable pattern and a protrusion, in accordance with an exemplary implementation. FIG. 2B is a side view of the target shown in FIG. 2A. FIG. 2C is a bottom view of the target shown in FIG. 2A.

FIG. 3 is a front view of the target in FIGS. 2A-2C, rotated about the z axis.

FIG. 4A is a bottom view, and FIGS. 4B and 4C are front views, of the target shown in FIGS. 2A-2C, rotated about the y axis.

DETAILED DESCRIPTION

Figure 5A:
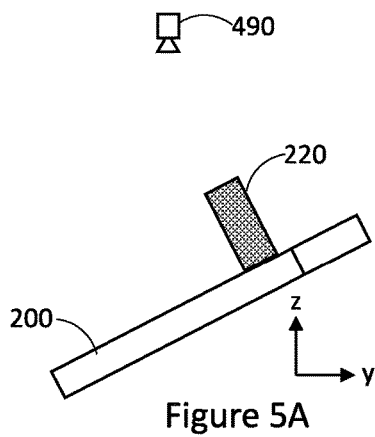
FIG. 5A is a side view.

The description herein details several exemplary embodiments. One skilled in the art will appreciate that it is within the scope of the present disclosure to combine individual embodiments with other embodiments as appropriate.

FIG. 1 illustrates an exemplary scenario in which a surgical procedure is being performed. Any of the targets or tracking systems described herein can be used in the context described with reference to FIG. 1, and in the ways described with reference to FIG. 1.

In the example of FIG. 1, a total hip arthroplasty (THA) is being performed, but the discussion herein is applicable to any surgical procedure where a tracking system is used, or any appropriate procedure other than surgery. In FIG. 1, a patient's pelvis 102 and femur 104 are shown. A target 112 is positioned on (e.g. affixed to, mounted on, or touched against) femur 104. As examples, target 112 could include an extension with a tip for probing the femur; target 112 could be coupled to the femur by at least one of a pin or screw; or target 112 could be removably coupled to a mount (such as a magnetic mount) which in turn is coupled to the femur by at least one of a pin or screw. An image sensor 122 is positioned on pelvis 102. Image sensor 122 can capture image data over a field of view 124. Image sensor 122 can communicate captured image data to computing device 132. Image sensor 122 is shown as being communicatively coupled to computing device 132 by wire 126, but wireless communication between image sensor 122 and computing device 132 is also possible. Further, it is also possible for image sensor 122 and computing device 132 to be a unified device. Computing device 132 can analyze the image data (for example by at least one processor in computing device 132), or computing device 132 can send the data to a remote device or cloud server for analysis, to detect target 112 and determine a pose (position and orientation) thereof. Pose can be position or orientation in three-dimensional space, though in certain applications pose can be position and orientation in two-dimensional space. Further, based on the pose and pre-determined geometry of target 112, computing device 132 can also determine a pose of elements which target 112 is positioned on. In the example of FIG. 1, image sensor 122 can be affixed to pelvis 102, and target 112 can be affixed to femur 104. Consequently, movement of target 112 relative to image sensor 122 can correspond to movement of the femur 104 relative to pelvis 104. In this context, "tracking" an element can entail continuously, regularly, or intermittently determining a pose of the element.

FIG. 1 also illustrates target 114 positioned on a tool 142. In the case of FIG. 1, tool 142 is a cup impactor for implanting a prosthetic hip cup during THA, but target 114 can be positioned on any appropriate tool. As examples, target 114 could include an extension with a tip for probing the tool; target 114 could be coupled to the tool by clips or fasteners; or target 114 could be removably coupled to the tool by magnetism (directly, or indirectly via a magnetic mount secured to the tool). Image sensor 122 can capture image data including target 114, which can subsequently be analyzed by computing device 132 (or a remote analysis device as mentioned above) to determine pose information of tool 142. Target 114 can be identical to target 112, or target 114 and target 112 could be different (for example by having different geometry from each other). In some implementations, target 112 could be removably positioned on a base mounted to femur 104, such that target 112 can be removed from and replaced on femur 104 without affecting the positioning of target 112 when positioned on femur 104. In such cases, target 112 can be removed from the base, and positioned on other elements (such as tool 142), such that multiple tracking operations can be achieved with a single target. In such implementations, the functionality of target 114 could be achieved with target 112.

Information based on the pose of an element of interest can be presented by display 134 of computing device 132 (or another device). This information can provide helpful or critical information to the surgeon. Further, other output means can also be used, such as audio output like speakers.

In order to accurately determine the pose of the anatomy (e.g. pelvis 102, femur 104) or the tool 142, registration steps can be performed to determine the geometry of the anatomy/tool relative to a target. As non-limiting examples, steps such as probing the element with a target, moving the element with the target in the field of view of the image sensor, or registering additional information such as acceleration or gravity data using an accelerometer in the sensor 122 and/or target 112 or 114, can be performed.

FIG. 1 shows exemplary anatomy of pelvis 102 and femur 104. However, any appropriate anatomy can be tracked, including for example leg, arm, torso, head, back, or chest anatomy, including bones therein. As mentioned above, the targets discussed herein can also be used in non-surgical applications.

Throughout this disclosure, reference is made to a "tracking system". Such a tracking system can refer to a device such as computing device 132, or any other appropriate device capable of processing, which can receive data representing a target, and determining a pose of the target or pose of an element in contact with the target. Broadly, a tracking system can also include an image sensor and a target.

FIGS. 2A, 2B, and 2C illustrate a target 200 in accordance with an exemplary implementation. FIG. 2A is a front view of target 200. FIG. 2B is a side view of target 200 as viewed along the direction of the x axis shown in FIG. 2A. FIG. 2C is a bottom view of target 200 as viewed along the direction of the y axis shown in FIG. 2A. Target 200 is generally planar in structure, having a planar surface 210 in the x-y plane shown in FIG. 2A. Extending from planar surface 210 is protrusion 220. Protrusion 220 is shown as extending in the z direction perpendicular to planar surface 210, but this is not necessarily the case. In alternative implementations (such as described with reference to FIG. 8 later), protrusion 220 is non-parallel with, but not fully perpendicular to, planar surface 210.

Planar surface 210 has an optically detectable pattern thereon which is identifiable by a tracking system to determine a position of target 200 in space and an orientation of target 200 about a first axis (the z axis in FIGS. 2A-2C). An example is illustrated in FIG. 3, which is a front view of target 200 in a different orientation from the orientation of FIG. 2A. Target 200 includes a set of regions 212 and a set of regions 214 which contrast with each other. In some implementations, the set of regions 212 can be a different color from the set of regions 214. In other implementations, the first set of regions 212 appear with a first brightness to the tracking system, and the set of regions 214 appear with a second brightness to the tracking system. In the examples of FIGS. 2A-2C and 3, the first brightness is higher than the second brightness, with the first brightness being shown as white and the second brightness being shown as black, but in alternative implementations this can be reversed. In the examples of FIGS. 2A-2C and 3, the set of regions 214 comprise a plurality of lines which extend along planar surface 210, though alternative patterns are possible, such as an array of dots, circles, squares, or other shapes. Further, different quantities of lines or shapes are also possible as appropriate for a given application. Further still, although the plurality of lines are shown extending entirely across the planar surface, in alternative implementations some or all of the line may extend only part-way across the planar surface. Some or all of the plurality of lines may also be curved instead of straight. The set of regions 214 are optically detectable by a tracking system relative to the set of regions 212. In the illustrated example, the set of regions 214 are dark lines which extend along bright regions 212. For example, the set of regions 212 can be formed as a single region of reflective, retroreflective, or back-illuminated material (such as translucent diffuse material, with at least one light source positioned proximate thereto to emit light through regions 212) to be detected by a tracking system as a "bright" material. In this example the set of regions 214 are opaque, non-reflective or light-absorptive material, such as paint, tape, or a structural mask which appears to a tracking system as a "dark" material, and extends along and masks the bright material. In other examples, the set of regions 212 are formed as separate regions with regions in the set of regions 214 positioned therebetween. In other implementations, the materials of regions 212 and 214 can be reversed, such that regions 212 are "dark" and regions 214 are "bright". Analysis of line patterns is discussed in more detail later with reference to FIG. 12.

Throughout this disclosure, "optically detectable" refers to detectability by a tracking system, and does not necessarily correspond to what is seen by the human eye. For example, an optically detectable pattern could be visible in the infrared spectrum outside of the normal wavelength range of human vision. Generally, an optically detectable pattern entails a contrast between at least two regions which form the pattern. In some implementations, an optically detectable pattern comprises regions of different color. In other implementations, an optically detectable pattern comprises regions which appear to a tracking system as "bright" and other regions which appear to a tracking system as "dark". "Bright" and "dark" as used herein are relative to each other, such that a "bright" region or material appears to a tracking system with greater brightness than a "dark" region or material. In cases where a "bright" material is a reflective or retroreflective material, an image sensor in a tracking system can be proximate to or built in combination with at least one light source to illuminate the material.

In target 200, the lines of the set of regions 214 intersect at a plurality of points (one such point is labelled as 216 in FIG. 3). The geometry of the lines and/or intersection points is known to a tracking system. When the tracking system views target 200, the position and orientation of the lines and/or intersections is compared to the known geometry to identify a position of target 200 in space, as well as an orientation of the target 200. Orientations about the z axis shown in FIGS. 2A-2C are accurately determinable using this technique. FIG. 3 illustrates target 200 in one such orientation, rotated about the z axis compared to target 200 as shown in FIG. 2A. However, as discussed below with reference to FIGS. 4A-4C and 5A-5B, rotations about the y and the x axis are more difficult to determine accurately, especially if a low-resolution image sensor, or low-processing burden algorithms (e.g. fast but inaccurate algorithms) are used by the tracking system. It is desirable for targets to include features which enable accurate determination of orientation about the x or y axis (i.e., rotations where the surface 210 is rotated out of the plane of the page with reference to FIGS. 2A and 3).

FIGS. 4A and 4B illustrate target 200 from a bottom view and a front view, respectively. In FIGS. 4A and 4B, target 200 is rotated about the y axis, relative to the orientations illustrated in FIGS. 2A and 2C. However, comparing FIG. 2A to 4B, this rotation about the y axis is barely, if at all, detectable when viewed by an image sensor 490 based on a pattern on surface 210 of target 200. In particular, despite relatively substantial rotation of target 200 about the y axis, positions of lines 214 and intersections 216 as they appear on image sensor 490 are barely different from the positions of the same in FIG. 2A. A similar discussion applies to rotation of target 200 about the x axis. Consequently, measuring rotation of target 200 about the x axis or y axis based on a pattern on surface 210 will have limited accuracy.

However, target 200 includes protrusion 220, which provides accurate information regarding orientation of target 200 about the x and y axes. In particular, a shape of target 200 which is occluded by protrusion 200 is indicative of orientation about the x axis and/or the y axis. In the example of FIG. 4B, in addition to a front surface 222 of protrusion 220 being visible to image sensor 490, a side surface 224 of protrusion 220 is also visible to image sensor 490. In the context of FIG. 4B, instead of detecting a circle corresponding to a circular cross section of protrusion 220, the tracking system will detect an oblong shape. The dimensions and orientation of the oblong shape are indicative of orientation of target 200 about the x axis and/or the y axis. The size of the occlusion along the x axis is labelled as distance $D_1$ in FIG. 4A.

FIG. 4C is a view of target 200, rotated at an even greater angle about the y axis than that shown in FIG. 4C. Because of this greater rotation, side surface 224 of protrusion 220 occludes an even greater area of a region or regions within the set of regions 212 of target 200 than that shown in FIG. 4B.

For occlusion of a region or regions within the set of regions 212 by protrusion 220 to be detectable, protrusion 220 should be made or coated with an optically detectable material relative to region 212. For example, if the set of regions 212 comprises "bright" regions (e.g. reflective, retroreflective, or back-illuminated), protrusion 220 should be a "dark" material (e.g. non-reflective, light absorptive, or opaque). Alternatively, if the set of regions 212 comprises a "dark" region (e.g. non-reflective, light absorptive, or opaque), protrusion 220 should be a "bright" material (e.g. reflective, retroreflective, or back-illuminated).

Figure 5B:
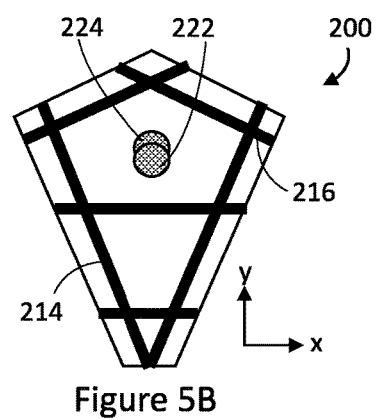
FIG. 5B is a front view, of the target shown in FIGS. 2A-2C, rotated about the x axis.

FIG. 5A is a side view and FIG. 5B is a front view of target 200, rotated about the x axis compared to as shown in FIGS. 2A and 2B. Similar to as discussed above, rotation of target 200 about the x axis is barely, if at all, detectable based on the pattern of intersections 216 on surface 210. However, in addition to front surface 222 of protrusion 200 being visible to image sensor 490, side surface 224 of protrusion 220 is also visible to image sensor 490. The shape, size, and orientation of region 212 of target 200 occluded by protrusion 220 is indicative of rotation of target 200 about the x axis. For this purpose, protrusion 220 should be optically detectable relative to region 212 of target 200, as discussed above.

Figure 6:
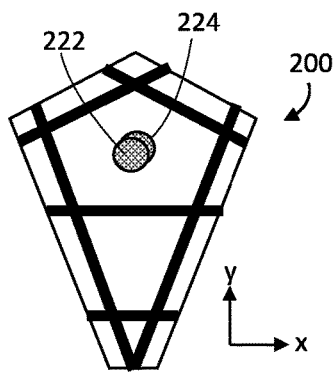
FIG. 6 is a front view of the target shown in FIGS. 2A-2C, rotated about the x axis and the y axis.

FIG. 6 is a front view of target 200, rotated about both the x axis and the y axis compared to as shown in FIGS. 2A-2C. The shape of region 212 occluded by protrusion 220 is indicative of both rotations, in that the occlusion is an oblong shape extending diagonally across the view. A vertical component of the occlusion can be used to determine rotation of target 200 about the x axis, whereas a horizontal component of the occlusion can be used to determine rotation of target 200 about the y axis.

Figure 7A:
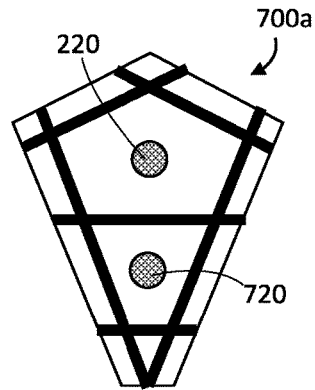
FIG. 7A is a front view of another exemplary target, featuring two protrusions extending from the planar surface of the target.

FIGS. 2A-2C, 3, 4A-4C, 5A, 5B, and 6 illustrate target 200 as having a single protrusion 220 extending from surface 210, but in alternative implementations additional protrusions are included. FIG. 7A is a front view of a target 700a which is similar to target 200. Unless context indicates otherwise, description of target 200 is applicable to target 700a. One difference between target 200 and target 700a is that in addition to protrusion 220, target 700a includes a second protrusion 720, which is structured similarly to protrusion 220 and has similar functionality. If desired, even more additional protrusions could be included. Advantageously, including multiple protrusions can improve accuracy. For example, depending on the length of a protrusion, and its distance from regions of the patterned surface against which it is not optically detectable, the extent of occlusion by said protrusion may become obfuscated when it overlaps with said region of the pattern, reducing accuracy. This can be seen in FIG. 4C, where protrusion 220 nearly overlaps with a dark line when viewed by image sensor 490. Further, at a steep enough viewing angle, a protrusion may extend beyond the edge of target 700a, such that further rotation will not change the shape of occlusion by the protrusion. These issues can be remedied by inclusion of additional protrusions, which can provide accurately detectable occlusion even if the shape of another protrusion is obfuscated or falls off the edge of the target. Additionally, inclusion of additional protrusions can increase robustness against external occlusion of the target, such as by tools, appendages of an operator, or anatomy of a patient. If one protrusion is occluded, orientation of the target may still be determinable from another protrusion.

Figure 7B:
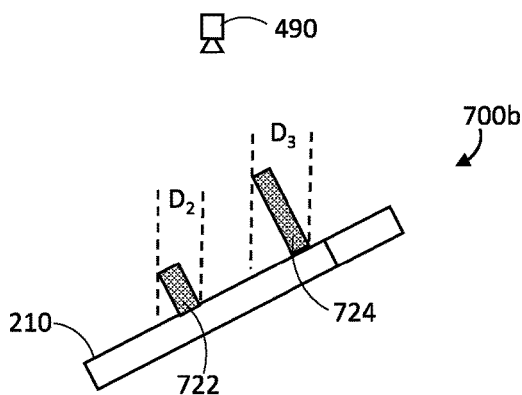
FIG. 7B is a side view of another exemplary target, having two protrusions of different lengths.

FIG. 7B is a side view of an exemplary target 700b, which is similar to target 700a in FIG. 7A. Description of target 700a is applicable to target 700b unless context dictates otherwise. In FIG. 7B, target 700b is shown as including two protrusions 722 and 724 extending from planar surface 210, with different heights (i.e. protrusions 722 and 724 extend from planar surface 210 to different extents from each other). This is helpful to provide a greater range of angular information. In the example of FIG. 7B, target 700b is oriented out of a plane viewed by an image sensor 490 (i.e. target 700b is rotated about an x axis extending into and out of the page). Because protrusions 722 and 724 have different heights, occlusion of the target 700b by each protrusion will be different. In the example, protrusion 722 occludes target 700b over a distance $D_2$, whereas protrusion 724 occludes target 700b over a distance $D_3$. This difference in occlusion distance is helpful for providing accurate angular information even if one of the protrusions is obfuscated by part of the pattern on the planar surface 210 of target 700b, or if one of the protrusions extends beyond the edge of that target 700b at a given viewing angle. For example, protrusion 724 may provide accurate angular information for rotations of the target 700b between 0° and 10°, but beyond 10° protrusion 724 may overlap with a portion of the pattern which renders a tip of the protrusion difficult to detect, or protrusion 724 may extend beyond an edge of the target. However, protrusion 722 may provide accurate angular information for rotations of the target 700b between 10° and 30°, such that when protrusion 724 cannot be accurately detected, protrusion 722 can be relied on instead. The protrusion heights, occlusion distances, angles, and angular ranges discussed are merely exemplary, and any protrusion heights, occlusion distances, angles, and angular ranges can be implemented as appropriate for a given application.

Additionally, orientation of a target may be determinable at angles which exceed the angular range which the at least one protrusion is indicative of. In particular, beyond a certain angle (e.g., 15° about the x or y axis), the optically detectable pattern on the planar surface of the target may provide accurate enough information to determine orientation of the target about all desired axes, without relying on information from the at least one protrusion. In an illustrative example, a tracking system may rely on the at least one protrusion to indicate orientation of the target about the x and/or y axis when said orientation is less than 15°, and the tracking system may rely on the optically detectable pattern to indicate orientation about the x and/or y axis when said orientation is 15° or greater. The dimensions of the at least one protrusion can be designed with this in mind. In particular, the at least one protrusion can be dimensioned to avoid overlap with certain areas of the optically detectable pattern, and/or to avoid extending beyond an edge of the target, when viewed by an image sensor at angles less than 15°. Beyond 15°, on the other hand, the at least one protrusion may overlap parts of the optically detectable pattern or extend beyond the edge of the target.

In any of the targets discussed herein, an extent to which a protrusion extends from a planar surface of the target can be known to a tracking system, and the tracking system can determine orientation of the target based on the occlusion that results from a protrusion of the known extent.

Figure 8:
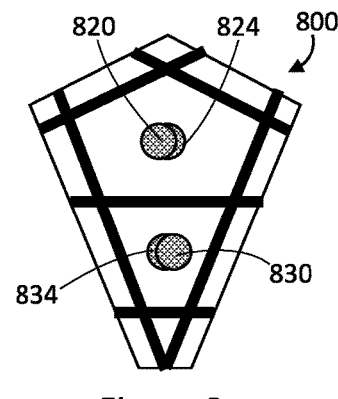
FIG. 8 is a front view of yet another exemplary target, featuring two protrusions extending from a planar surface of the target in different directions.

FIGS. 2A-2C, 3, 4A-4C, 5A, 5B, 6, 7A and 7B illustrate targets having a protrusion or protrusions which extend perpendicular to a surface of the target. However, this is not necessarily the case. FIG. 8 is a front view of a target 800, which is similar to target 700a in FIG. 7A. Description of target 700a is applicable to target 800 unless context dictates otherwise. Target 800 has a first protrusion 820 and a second protrusion 830 extending therefrom, but at angles which are not perpendicular to a surface of target 800. In particular, protrusion 820 extends outward and to the left (with reference to the orientation of the page), such that a side surface 824 of protrusion 820 is visible. Multiple protrusions extending from a target can be parallel to each other, but this is also not necessarily the case. In the example of FIG. 8, protrusion 830 extends outward and to the right (with reference to the orientation of the page), such that a side surface 834 of protrusion 830 is visible. Configuring multiple protrusions to extend non-parallel to each other may provide more diversity to the protrusions, increasing robustness or accuracy of the target.

Figure 9A:
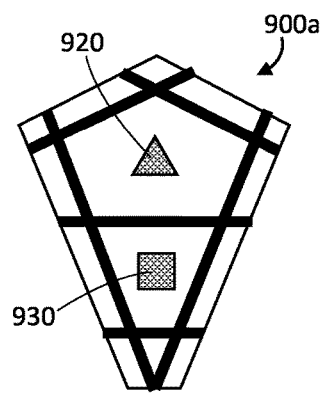
FIG. 9A is a front view of yet another exemplary target, featuring two protrusions having different shape extending from a planar surface of the target.

FIGS. 2A-2C, 3, 4A-4C, 5A, 5B, 6, 7A, 7B, and 8 illustrate targets having a protrusion or protrusions that are cylindrical posts. However, any appropriate shape of protrusion could be used. FIG. 9A is a front view of a target 900a, which is similar to targets 700a and 800 illustrated in FIGS. 7A and 8. Description of targets 700a and 800 is applicable to target 900a unless context dictates otherwise. One difference between target 900a and targets 700a and 800 is that target 900a has differently shaped protrusions. In particular, target 900a includes protrusion 920 having a triangular cross section, and a protrusion 930 having a square-shaped cross-section. Other cross-section shapes are possible, such as any prism-shaped cross-section, or curved cross-sections.

Figure 9B:
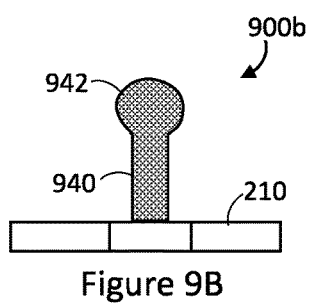
FIGS. 9B and 9C are a bottom view and a front view, respectively, of an exemplary target having an enlarged tip on the end of a protrusion therefrom.
Figure 9C:
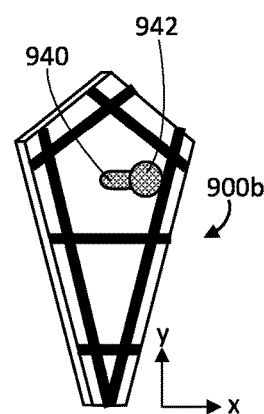

FIG. 9B is a bottom view of a target 900b, which is similar to target 200 illustrated in FIGS. 2A-2C and 4A-4C. Description of target 200 is applicable to target 900b unless context dictates otherwise. Target 900b includes a protrusion 940 similar to protrusion 220 in target 200. One difference between target 900b and target 200 is that protrusion 940 of target 900b has a tip 942 at an end thereof, distal from the planar surface 210 of the target. Tip 942 is shown as having a spherical shape (though other shapes are possible, such as cube, diamond, prism, oblong, etc.). Tip 942 is larger in diameter than the shaft of protrusion 940. This will result in tip 942 having a distinguished shape relative to the shaft of protrusion 940, providing enhanced accuracy to the target. FIG. 9C is a front view of target 900b, rotated about the y axis similar to target 200 in FIG. 4C. Tip 942 is shown as occluding a large circular area of target 900b, which is visually different from the area occluded by the shaft of protrusion 940. Based on this, the position of tip 942 can be accurately determined by a tracking system, which can be used to accurately determine an orientation of target 900b out of the plane of the page.

Generally, in the targets herein, it is desirable for a protrusion to be as thin as possible, while maintaining acceptable optical detectability and physical durability. This will minimize an area of the target's identifiable pattern which is potentially occluded by the protrusion. Inclusion of a tip such as tip 942 is helpful in this regard, in that the tip itself can be relatively large for ease of detection, whereas the protrusion can be thinner to minimize occlusion by the tip.

Figure 10:
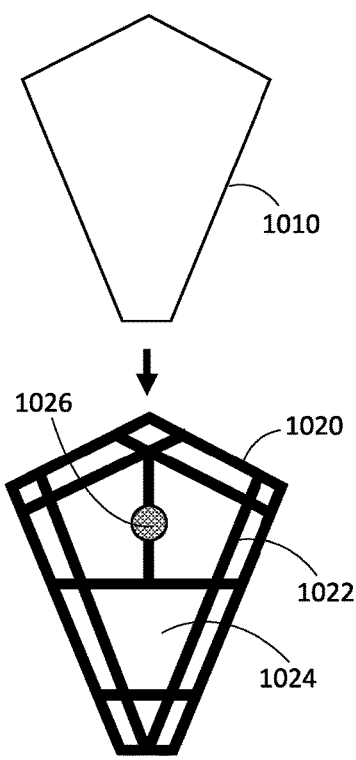
FIG. 10 is a front view of yet another exemplary target, constructed of a cartridge and a mask unit.

FIG. 10 is a front view of an exemplary target 1000, showing a construction thereof. Target 1000 is similar to targets 200, 700, 800, and 900. Discussion of targets 200, 700, 800, and 900 is applicable to target 1000 unless context dictates otherwise. Target 1000 comprises a cartridge 1010 insertable into a mask unit 1020. Mask unit 1020 includes solid portions 1022 (indicated by solid lines) which have openings, such as 1024 (indicated by white space between the solid lines). Solid portions 1022 support at least one protrusion 1026. When cartridge 1010 is inserted into mask unit 1020, regions of cartridge 1010 will be exposed through openings such as 1024 of mask unit 1020, whereas solid portions 1022 will mask other regions of cartridge 1010. In this way, an optically detectable pattern can be established. In some implementations, cartridge 1010 is a "bright" material such as a reflective, retroreflective, or diffusive material which emits or reflects light detectable by a tracking system; on the other hand, mask unit 1020 comprises "dark" material such as non-reflective, absorptive, or opaque material. In this way, an optically detectable pattern is achieved by the contrast between cartridge 1010 and mask unit 1020. In other implementations, cartridge 1010 comprises a "dark" material and mask unit 1020 comprises a "bright" material, again achieving optically detectable contrast between cartridge 1010 and mask unit 1020. The at least one protrusion 1026 is either a "bright" material or a "dark" material, according to what contrasts with cartridge 1010.

FIG. 10 illustrates one possible construction of a target, but other constructions are possible, such as a preformed unit having regions which contrast each other to have an optically detectable pattern, or even tape over a base unit where the tape contrasts with the base unit. As another example, instead of a cartridge insertable into a mask unit as in FIG. 10, a cartridge could be attached to a back side of the mask unit, such as with clips or adhesive.

Figure 11:
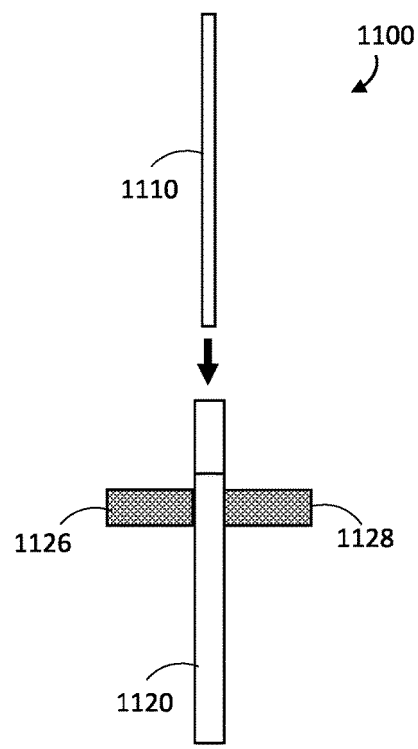
FIG. 11 is a side view of yet another exemplary target, having two trackable sides.

FIG. 11 is a side view of an exemplary two-sided target 1100. Target 1100 is similar to target 1000, and discussion of target 1000 applies to target 1100 unless context dictates otherwise. One difference between target 1100 and target 1000 is that target 1100 is shown as having two trackable sides. In particular, a first trackable side has an optically detectable pattern thereon with protrusion 1126 extending therefrom, and a second trackable side has an optically detectable pattern with protrusion 1128 extending therefrom. Inclusion of two (or more) trackable sides increases viewable angles of the target. In the example of FIG. 11, a cartridge 1110 is insertable into a mask unit 1120 similar to in FIG. 10, to be exposed on both trackable sides of the target. As another example, separate mask units could clip or adhere onto each side of a cartridge.

Figure 12:
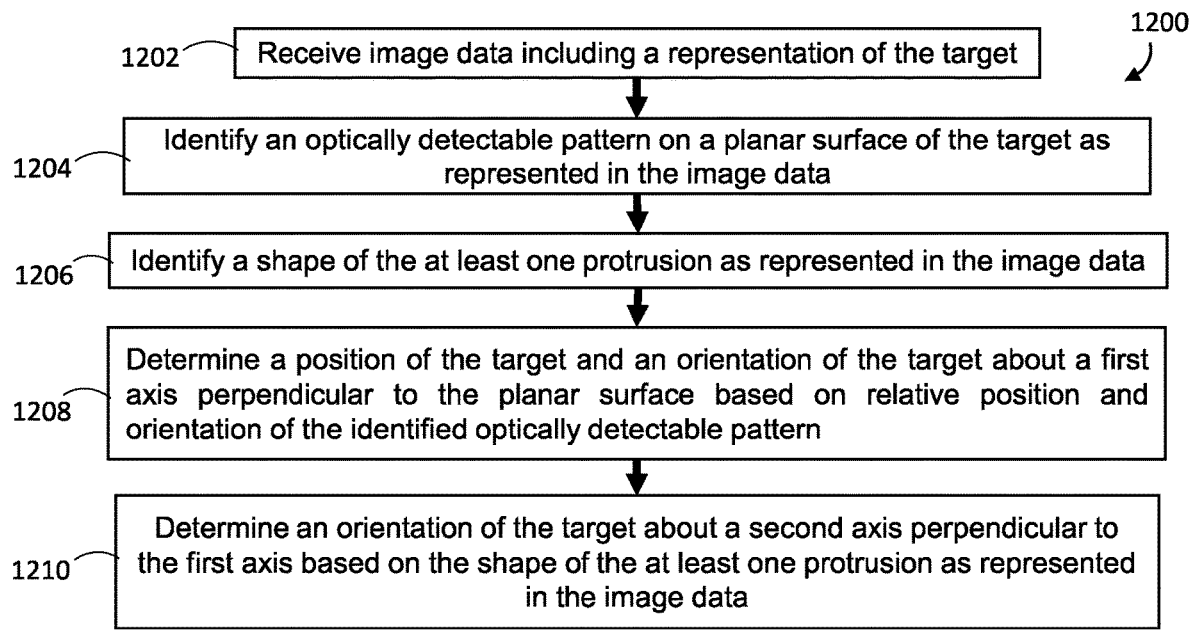
FIG. 12 is a flowchart diagram of a method, in accordance with an example, for using the targets of FIGS. 2A-2C, 3, 4A-4C, 5A-5B, 6, 7, 8, 9, 10, and 11.

FIG. 12 is a flowchart diagram which illustrates, in accordance with an example, a computer implemented method 1200 for tracking any of the targets described with reference to FIGS. 2A-2C, 3, 4A-4C, 5A, 5B, 6, 7A, 7B, 8, 9A, 9B, 10, and 11. Method 1200 can be performed by a tracking system, such as that described with reference to FIG. 1. In particular, processing acts are performed by a processing unit of such a tracking system, such as a processing unit in computing device 132. FIG. 12 includes at least acts 1202, 1204, 1206, 1208, and 1210; additional acts could be added, or acts could be removed or rearranged, as appropriate for a given application.

In act 1202, image data including a representation of the target is received. For example, an image sensor of a tracking system can capture image data, and provide this image data to a processing unit of the tracking system.

In act 1204, an optically detectable pattern on a planar surface of the target as represented in the image data is identified. For example, in targets where the optically detectable pattern is a plurality of lines extending along a planar surface of the target (as shown in FIGS. 2A, 3, 4B, 4C, 5B, 6, 7, 8, 9, and 10), line detection is performed to at least partially identify the plurality of lines. As an example, a Standard Hough Transform (SHT) can be performed. Other approaches, such as those based on edge detection or convolution, could be used additionally or alternatively. Optionally, intersections between lines can be determined for tracking. In cases where full detection of lines cannot be achieved (e.g. if a line is partially occluded), lines and intersections can still be detected by extrapolating from portions of the lines which are detectable. Optionally, prior to identifying an optically detectable pattern, image binarization can be performed to convert the image to only represent "bright" regions and "dark" regions based on a brightness threshold, and detection is performed based on boundaries between the bright and dark regions. Also optionally, processing speed and accuracy can be improved by filtering line candidates by only performing line detection in regions where lines are expected to be, based the optically detectable pattern being known to the tracking system. For example, if certain features are identified (such as fiducials on the target or a small number of lines), expected locations of the remaining lines can be predicted and only these predicted locations can be processed.

In act 1206, a shape of the at least one protrusion as represented in the image data is identified. For example, a processing unit of the tracking system can perform edge detection to identify a boundary of the planar surface of the target which is occluded by the at least one protrusion, as discussed above with reference to FIGS. 4A-4C, 5A, 5B and 6. Optionally, processing speed and accuracy can be improved by limiting processing to a region where the protrusion is expected to be, based on a known geometry of the target.

In act 1208, a position of the target in space, and an orientation of the target about a first axis perpendicular to the planar surface are determined based on the relative position and orientation of the identified optically detectable pattern. For example, with reference to target 200 in FIGS. 2A-2C and 3, the location of the plurality of lines or the intersections of said lines is used to identify the position of the target in space, and to identify an orientation of the target about the z axis.

In act 1210, an orientation of the target about a second axis perpendicular to the first axis is determined based on the shape of the at least one protrusion as represented in the image data. For example, with reference to target 200 in FIG. 4A-4C, or 5A-5B, a processing unit of the tracking system determines an orientation of the target about the x axis or the y axis is determined based on the shape of the protrusion 220 as discussed above. In particular, orientation of the target about the second axis is determined based on a shape of a portion of the planar surface occluded by the protrusion.

In implementations with at least two protrusions, such as in FIGS. 7A, 7B, 8, and 9A, determination of the orientation of the target about the second axis is based on the shape of at least one protrusion of the at least two protrusions as represented in the image data. For example, in implementations wherein each protrusion of the at least two protrusions extends from the planar surface to a different extent, determination of the orientation of the target about the second axis is based on: the shape of a first protrusion of the at least two protrusions as represented in the image data when the orientation of the target about the second axis is within a first angular range; or the shape of a second protrusion of the at least two protrusions as represented in the image data when the orientation of the target about the second axis is within a second angular range different from the first angular range. This is discussed in detail above with reference to FIG. 7B.

In implementations wherein each protrusion of the at least one protrusion includes a respective tip at an end of thereof distal from the planar surface, the tip having a larger diameter than a diameter of the respective protrusion, determination of the orientation of the target about the second axis is based on a position or shape of at least one respective tip as represented in the image data. This is discussed in detail above with reference to FIGS. 9B and 9C.

In some implementations, determining an orientation of the target about the second axis perpendicular to the first axis comprises comparing the shape of the at least one protrusion as represented in the image data to a known geometry of the at least one protrusion. For example, the extent to which a protrusion extends from a planar surface of a target can be known to a tracking system (for example by the tracking system having a model of the target). The tracking system can compare the shape of the at least one protrusion as represented in the image data (occlusion of the planar surface by the protrusion) to the model, to determine a relative orientation of the protrusion and planar surface with respect to the image sensor.

Optionally, an orientation of the target about a third axis non-parallel to the second axis is determined based on the shape of the at least one protrusion as represented in the image data. For example, with reference to target 200 in FIG. 4A-4C, or 5A-5B, a processing unit of the tracking system determines an orientation of the target about the other of the x axis or the y axis (the axis about which orientation wasn't identified in act 1210) based on the shape of the protrusion 220 as discussed above. As discussed with reference to FIG. 6, a directional component of the shape occluded by the protrusion can be used to identify orientation about a specific axis. In some implementations, this act could be included in act 1210.

In FIGS. 2A, 4B, 4C, 5B, and 6, the x and y axis are illustrated as perpendicular to each other. However, in determining rotation about such axis out of the plane of the target, such axes do not have to be perpendicular, but could instead just be non-parallel, provided accurate enough information about orientation can be determined.

With reference again to FIG. 1, an optical tracking system is described, which includes any of the targets described with reference to FIG. 2A-2C, 3, 4A-4C, 5A, 5B, 6, 7, 8, 9, 10, or 11. The optical tracking system further includes an image sensor (image sensor 122 in FIG. 1), and a processing unit (such as a processor in computing device 132 in FIG. 1). In use, the image sensor captures image data including at least one representation of target 112 or target 114. Such image data can be a still image, or multiple images, such as a video stream. The captured image data is directed from image sensor 122 to the processing unit (for example by a direct connection or over a network). The processing unit receives the image data, and determines a pose (position and orientation) of the target based on the captured image data, such as according to method 1200 in FIG. 12. In some implementations, in acts of identification of patterns, features, or shapes of elements of a target, the processing unit compares the position of patterns, features, or shapes of the target represented in the image data to positions of the patterns, features, or shapes in a model of the target. For example, a CAD or computer model of the target could be accessed by the processing unit, the model having a geometry which matches a known geometry of the target. In other examples, the model could be a simplified model which indicates relative orientation and position of important patterns, features, or shapes, and a key point of the target (such as the tip of an extension from the target, or a centroid of the target).

Figure 13A:
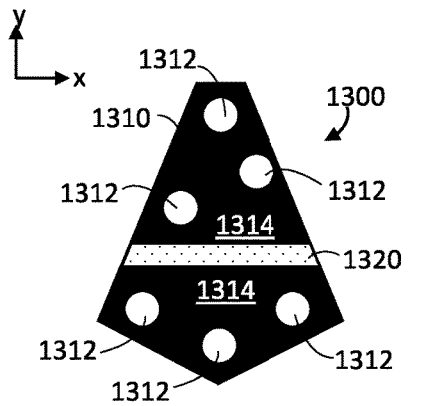
FIG. 13A is a front view of an exemplary target featuring an optically detectable pattern and a specular reflective region, in accordance with an exemplary implementation.
Figure 13B:
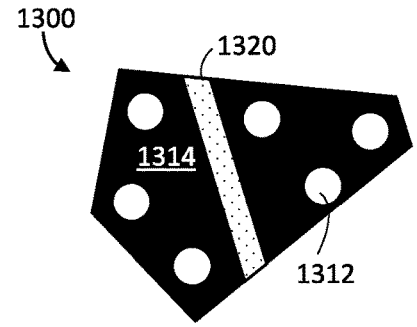
FIG. 13B is a front view of the target shown in FIG. 13A, rotated about the z axis.

FIGS. 13A and 13B illustrate front views of a target 1300 in accordance with an exemplary implementation. Target 1300 is generally planar in structure, having a planar surface 1310 in the x-y plane shown in FIG. 13A. Extending along planar surface 1310 is at least one specular reflective region 1320. Specular reflective region 1320 is shown in FIG. 13A as extending horizontally along planar surface 1310, but this is not necessarily the case. In alternative implementations, specular reflective region 1320 extends along the planar surface 1310 in a different direction. Additionally, specular reflective region 1320 is shown in FIG. 13A as extending from one edge of planar surface 1310 to another edge (i.e., entirely across planar surface 1310), but this is not necessarily the case. In alternative implementations, specular reflective region 1320 extends only part-way across the planar surface 1310.

Planar surface 1310 has a pattern thereon which is identifiable by a tracking system to determine a position of target 1300 in space and an orientation of target 1300 about a first axis (a z axis which is perpendicular to the x axis and y axis shown in FIGS. 13A and 13B). An example is illustrated in FIG. 13B, which is a front view of target 1300 in a different orientation from the orientation of FIG. 13A. Target 1300 includes a set of regions 1312 and a set of regions 1314 which contrast with each other. In some implementations, the set of regions 1312 can be a different color from the set of regions 1314. In other implementations, the set of regions 1314 appear with a first brightness to the tracking system, and the set of regions 1314 appear with a second brightness to the tracking system. In the examples of FIGS. 13A and 13B, the first brightness is higher than the second brightness, but in alternative implementations this can be reversed. In the examples of FIGS. 13A and 13B, the set of regions 1312 comprise a plurality circles or dots on the planar surface 1310, though alternative patterns are possible, such as an array of lines, squares, or other shapes. Further, any appropriate number of shapes (e.g. any appropriate number of circles or dots 1312) could be included. The set of regions 1312 are optically detectable by a tracking system relative to the set of regions 1314. In the illustrated example, the set of regions 1314 are dark material which extends along the planar surface 1310. In an example, the set of regions 1312 can be formed as a single region of reflective, retroreflective, or back-illuminated material (such as translucent diffuse material, with at least one light source positioned proximate thereto to emit light through regions 1312) to be detected by a tracking system as a bright material. In this example the set of regions 1314 are opaque, non-reflective or light-absorptive material, such as paint or a structural mask which extends along and masks the bright material. In other examples, the set of regions 1312 are formed as separate regions amongst the set of regions 1314. In other implementations, the materials of regions 1312 and 1314 can be reversed, such that regions 1312 are dark and regions 1314 are bright.

Figure 17A:
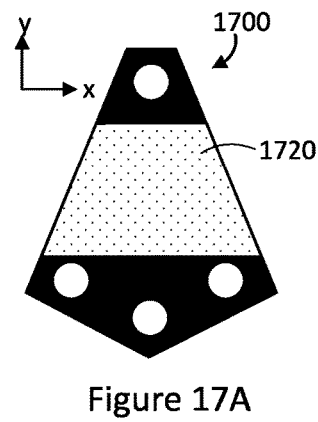
FIGS. 17A and 17B are front views of a target similar to that in FIGS. 13A and 13B, where the specular reflective region extends in two directions along the planar surface of the target, indicative of rotation of the target about the x axis and the y axis.
Figure 17B:
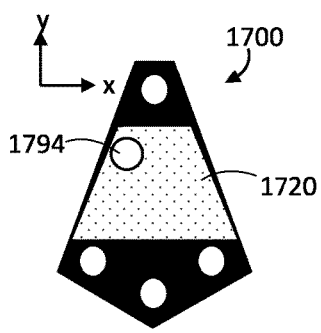
Figure 18:
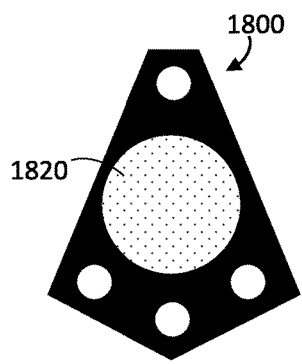
FIG. 18 is a front view of a target similar to that in FIGS. 17A and 17B, where the specular reflective region has a circular shape.

For target 1300, the geometry of the target and regions 1312 and 1314 is known to a tracking system. When the tracking system views target 1300, the position and orientation of regions 1312 and/or 1314 are compared to the known geometry to identify a position of target 1300 in space, as well as an orientation of the target 1300. Orientations about the z axis perpendicular to the x axis and y axis shown in FIGS. 13A and 13B are accurately determinable using this technique. FIG. 13B illustrates target 1300 in one such orientation, rotated about the z axis compared to target 1300 as shown in FIG. 13A. However, similar to as discussed above with reference to FIGS. 4A-4C, rotations about the y and the x axis are more difficult to determine accurately, especially if a low-resolution image sensor, or low-processing burden algorithms are used by the tracking system. Specular reflective region 1320 is included in target 1300, extending along planar surface 1310, to enable accurate determination of orientation about the x or y axis (i.e., rotations where the surface 1310 is rotated out of the plane of the page with reference to FIGS. 13A and 13B). In the example of FIG. 13A, specular reflective region 1320 is a strip which is particularly helpful for determining orientation about the y axis, but with different positioning and/or shape of specular reflective region 1320, orientation about the x axis can be determined. The specular reflective regions described herein can extend across the entirety of a planar surface of a target (e.g., from one edge of a planar surface to another edge of the planar surface), but this is not necessarily required. A specular reflective region may only extend partially across a planar surface of a target, provided enough distance is spanned to indicate orientation of the target as described below. FIGS. 17A, 17B, and 18 discussed later illustrate exemplary embodiments where specular reflective regions do not span across an entire planar surface of a target.

Figure 14A:
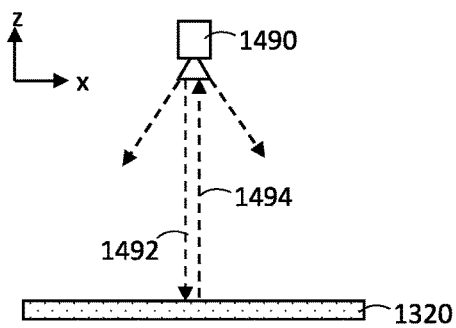
FIGS. 14A, 14B, and 14C are bottom cross-sectional views of the target shown in FIGS. 13A and 13B, showing an operational principle thereof.
Figure 14B:
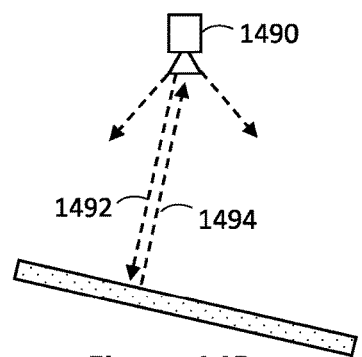
Figure 14C:
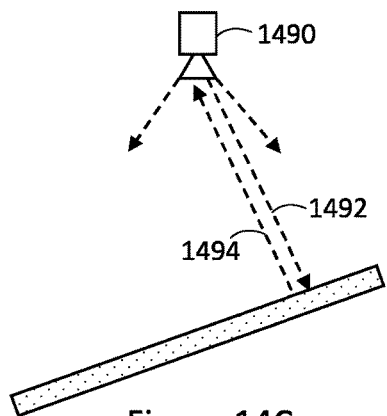

FIGS. 14A, 14B, and 14C are bottom cross-sectional views of specular reflective region 1320, which illustrate an operational principle thereof. A combination light source and image sensor 1490 is illustrated (such as an image sensor surrounded by light sources), though in practice a separate light source and image sensor in close proximity could be used instead. That is, 1490 represents at least one light source and an image sensor in close proximity such that light emitted by the light source approximates light originating from the image sensor. Light 1492 is emitted radially by the light source of 1490. A portion of light 1492 which is incident on specular reflector strip 1320 normal to a surface thereof will be reflected back towards light source/image sensor 1490. An orientation of specular reflector region 1320 will influence which portion of specular reflector region 1320 is normal to incident light 1492. In FIG. 14A, specular reflective region 1320 lies parallel to a plane viewed by the image sensor of 1490, such that light 1492 directly in front of image sensor will be reflected back to image sensor 1494. In FIG. 14B, due to the orientation of specular reflective region 1320, light 1492 projected left from light source/image sensor 1490 will be incident on specular reflective region 1320 normal thereto and be reflected back to the image sensor of 1490. In FIG. 14C, light 1492 emitted to the right from light source/image sensor 1490 will be incident on specular reflective region 1320 normal thereto and be reflected back towards light source/image sensor 1490. In view of the above, it can be understood that the position of specular reflective region 1320 from which light is received by image sensor 1490 receives light (i.e. the position of specular reflection as seen by the image sensor of 1490) is indicative of the orientation of specular reflective strip 1320. That is, the position of specular reflection as seen by the image sensor of 1490 is indicative of the orientation of target 1300 about the y axis in FIG. 13A (or the x axis, if the specular reflective region is positioned or shaped differently to in FIG. 13A).

Figure 14D:
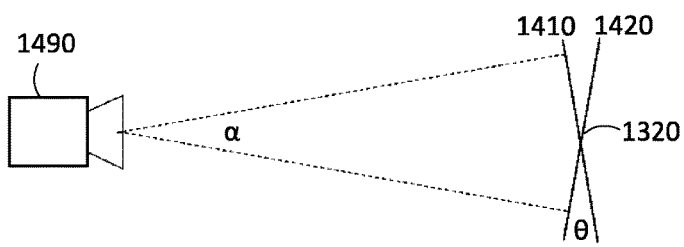
FIG. 14D is a conceptual view of the operational principle of the target shown in FIGS. 13A and 13B.

FIG. 14D is a conceptual view which illustrates the operational principle of target 1300 in an alternative manner to improve understanding. When light source/image sensor 1490 is pointed at specular reflective region 1320, specular reflection will occur on the surface of the specular reflective region 1320 where the surface normal passes through the optical center of the image sensor of 1490. In FIG. 14D, as the specular reflective region 1320 moves by angle $\theta$ from position 1410 to position 1420, the position of specular reflection captured by the image sensor 1490 moves from one side of the specular reflective region 1320 to the other, which subtends angle $\alpha$ along the image sensor.

Angle $\alpha$ is the same as angle $\theta$ by triangle similarity. Therefore, measuring the position of the specular reflection can be used to measure an angle approximately equivalent to the angle which the target subtends on the image sensor. For example, if a target is 10 cm across and is 50 cm away from the image sensor, the specular reflection from one side to the other represents a movement of approximately 11 degrees.

Figure 15A:
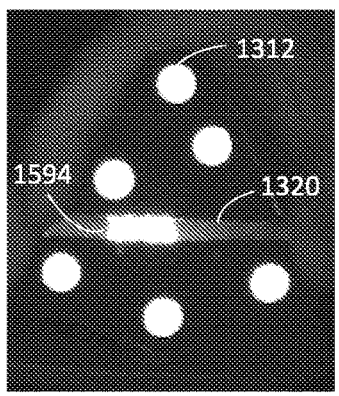
FIGS. 15A, 15B, and 15C illustrate image data of the target shown in FIGS. 13A and 13B, as captured by an image sensor.
Figure 15B:
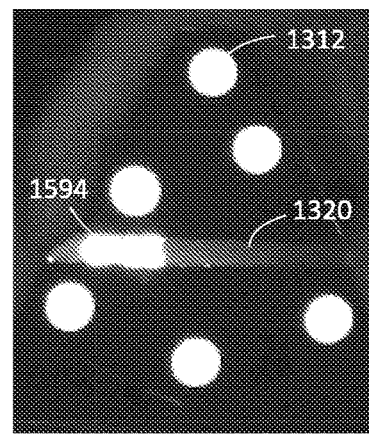
Figure 15C:
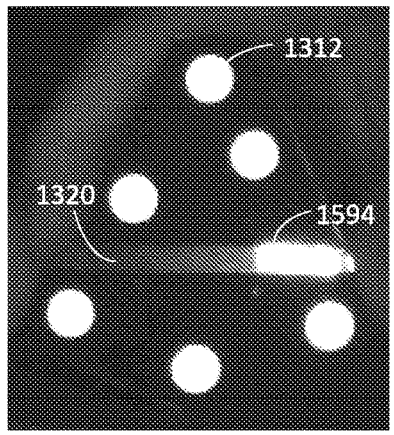

FIGS. 15A, 15B, and 15C illustrate image data of target 1300 in different orientations, as captured by an image sensor such as in light source/image sensor 1490, showing the above operational principle in effect. In FIGS. 15A-15C, target 1300 is illuminated by a light source proximate the image sensor, with the set of regions 1312 reflecting light from the light source towards the image sensor, and with a portion of specular reflective region 1320 reflecting light from the light source towards the image sensor. FIGS. 15A-15C show target 1300 having specular reflective region 1320 extending horizontally along a surface of target 1300, with each of FIG. 15A-15C showing target 1300 in substantially the same position, but oriented differently about an axis extending vertically with respect to the page. In FIGS. 15A-15C, detected positions of bright regions (e.g. 1312) are barely different from each other, but the position of light received from specular reflective region 1320 (i.e. the position of specular reflection) is very different. FIG. 15A shows specular reflection 1594 relatively close to the center of the field of view of the image sensor, indicating that the target is close to parallel to a plane viewed by the image sensor. FIG. 15B shows specular reflection 1594 at the far left of specular reflective region 1320, indicating that the target is rotated such that the left side of the target is closer to the image sensor than the right side of the target. FIG. 15C shows specular reflection 1594 at the far right of specular reflective region 1320, indicating that the target is rotated such that the right side of the target is closer to the image sensor than the left side of the target.

Figure 16A:
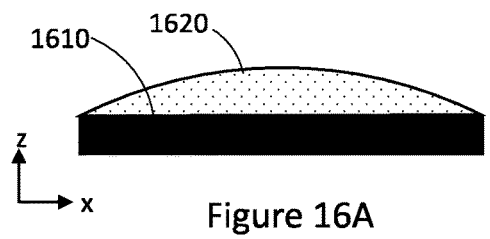
FIG. 16A is a bottom cross-sectional view of a target similar to that in FIGS. 13A and 13B, where the specular reflective region is comprised or positioned on a protrusion extending from a planar surface of the target.

Specular reflective region 1320 in target 1300 is shown in FIGS. 14A-14D and 15A-15C as being a flat region on a planar surface 1310. However, other shapes are possible. FIG. 16A is a bottom cross-sectional view of a target having a planar surface 1610, with a curved protrusion 1620 extending therefrom. Curved protrusion 1620 can have different shapes, with examples illustrated in FIGS. 16B and 16C.

The curved surface of protrusion 1620 is or has thereon a specular reflective region similar to specular reflective region 1320 in FIGS. 13A, 13B, 14A-14D, and 15A-15C. For example, specular reflective region 1320 can be a continuous specular reflective strip at least partially positioned on and extending along the curved surface of protrusion 1620. By the specular reflective region having a curved shape as in FIG. 16A, the viewable angles of a curved specular reflective region are greater than the viewable angles of a flat specular reflective region, thus increasing viewable angles of the target.

Figure 16B:
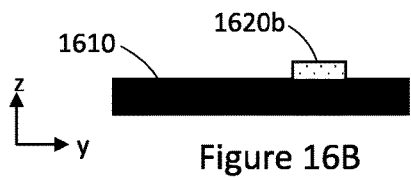
FIGS. 16B and 16C are side cross-sectional views of exemplary shapes of the protrusion illustrated in FIG. 16A.

FIG. 16B is a side cross-sectional view of one implementation of the target shown in FIG. 16A. In FIG. 16B, curved protrusion 1620b illustrates a shape of curved protrusion 1620 shown in FIG. 16A, according to one exemplary implementation. Curved protrusion 1620b has a rectangular cross-sectional shape in FIG. 16B, such that the only curvature of curved protrusion 1620b is the arc shape shown for curved protrusion 1620 in FIG. 16A. Stated differently, the curved protrusion 1620b has a partially cylindrical shape, with a longitudinal axis of the cylinder running left to right in FIG. 16B. With reference to FIG. 16A, when curved protrusion 1620 has the shape of curved protrusion 1620b, curved protrusion 1620 has a partially cylindrical shape with the longitudinal axis of the cylinder running into and out of the page.

Figure 16C:
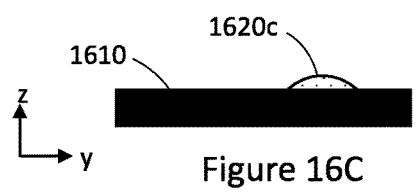

FIG. 16C is a side cross-sectional view of another implementation of the target shown in FIG. 16A. In FIG. 16C, curved protrusion 1620c illustrates a shape of curved protrusion 1620 shown in FIG. 16A, according to another exemplary implementation. One difference between FIG. 16C and FIG. 16B is that in FIG. 16C, the curved protrusion 1620c is shown as having a curved side cross-section. That is, curved protrusion 1620c is curved in multiple directions: in the manner shown for curved protrusion 1620 in FIG. 16A, and in the manner shown in FIG. 16C. This improves a viewable angular range of specular reflection from curved protrusion 1620c. In particular, with curved protrusion 1620b in FIG. 16B, if the target is not normal to a light source/image sensor (such as light source/image sensor 1490) about the x axis (i.e., the target is rotated about the x axis relative to the image sensor), no specular reflection may be visible to the image sensor, regardless of orientation of the target about the y axis. The target in FIG. 16C addresses this by being curved in multiple directions. In the illustrated example, even if the target is rotated about the x axis, a portion of curved protrusion 1620c will be normal to the light source image sensor, due to the curved shape of protrusion 1620c shown in FIG. 16C. Thus, even if the target is rotated about the x axis, specular reflection will be visible to the image sensor.

Figure 16D:
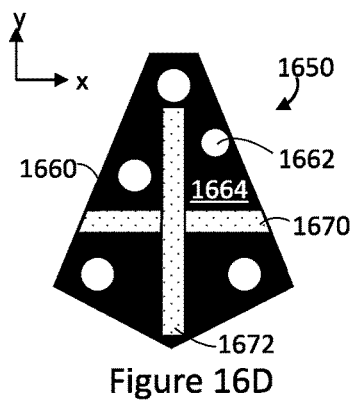
FIGS. 16D and 16E are front views of a target having two spectral reflective regions indicative of orientation of the target in two different directions.
Figure 16E:
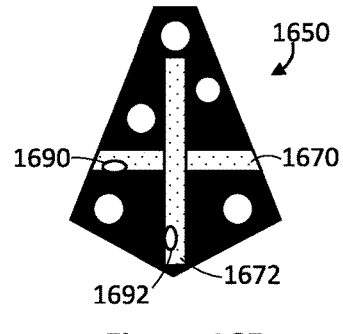

FIGS. 16D and 16E illustrate an exemplary target 1650 which includes a plurality of specular reflective regions akin to that shown in FIG. 16C, which can be used to determine orientation of the target about a plurality of axes. Target 1650 includes a planar surface 1660, having an optically detectable pattern thereon comprising bright regions 1662 and dark regions 1664. Target 1650 also includes a first specular reflective region 1670 extending along (part-way across or entirely across) planar surface 1660 in a first direction (the horizontal direction in this example), and a second specular reflective region 1672 extending along (part-way across or entirely across) planar surface 1660 in a second direction non-parallel to the first direction (the vertical direction in this example). Both specular reflective region 1670 and specular reflective region 1672 are curved as shown in FIG. 16C above (that is, the smaller dimension of the specular reflective region is curved). Optionally, the longer dimension of each specular reflective region can be curved as shown in FIG. 16A, though this is not required. In the illustrated example, the first specular reflective region 1670 extends along target 1650 in a direction perpendicular to the y axis, and is thus indicative of orientation of target 1650 about the y axis. On the other hand, the second specular reflective region 1672 extends along target 1650 in a direction perpendicular to the x axis, and is thus indicative of orientation of target 1650 about the x axis. This is illustrated by example in FIG. 16E.

FIG. 16E shows target 1650 rotated about the x axis and they axis relative to the orientation shown in FIG. 16D. In particular, the bottom-left region of target 1650 in FIG. 16E is closer to the viewer than the other regions of target 1650. For a light source/image sensor directed towards the page, specular reflections 1690 and 1692 are produced and visible to the image sensor. Specular reflection 1690 is visible from specular reflective region 1670. The position of specular reflection 1690 along the length of specular reflective region 1670 is indicative of orientation of target 1650 about the y axis relative to the image sensor. Specular reflection 1692 is visible from specular reflective region 1672. The position of specular reflection 1692 along specular reflective region 1672 is indicative of orientation of target 1650 about the x axis relative to the image sensor. By using a plurality of specular reflective regions in this way, components of rotation of a target can be determined by a tracking system.

FIGS. 13A, 13B, 15A-15C, and 16A-16E show specular reflective regions, which in respective embodiments are relatively thin continuous strips extending along a target. In other implementations, a more pronounced "two-dimensional" specular reflective region, or "specular reflective area" is used. The term "pronounced" here means that one dimension is not many times larger than the other dimension. FIG. 17A is a front view of a target 1700 which is similar to target 1300 discussed above. Description of target 1300 is applicable to target 1700 unless context indicates otherwise. One difference between target 1300 and target 1700 is that in target 1300 as shown in FIG. 13A, specular reflective region 1320 generally extends horizontally (with respect to the page) along target 1300, whereas target 1700 includes a specular reflective region 1720 which extends both horizontally and vertically (with respect to the page) along target 1700. In this way, the specular reflective region indicates orientation of target 1700 about both the x axis and the y axis. This is shown in FIG. 17B, where specular reflection 1794 appears at the top-left of specular reflective region 1720, which indicates that target 1700 is rotated about the y axis such that the left side is closer to the viewer than the right side, and target 1700 is rotated about the x axis such that the top of target 1700 is closer to the viewer than the bottom of target 1700. That is, a vertical component of the position of the specular reflection is indicative of rotation of target 1700 about the x axis, whereas a horizontal component of the position of the specular reflection is indicative of rotation of the target 1700 about the y axis (directional references with respect to the page).

The terms "two-dimensional" specular reflective region, or "specular reflective area" are used somewhat loosely, and refer to the ability of the specular reflective region to provide meaningful specular reflection position information in two dimensions or over an area. For example, specular reflective region 1320 in FIG. 13A extends horizontally to provide information regarding orientation of target 1300 about the y axis. However, specular reflective region 1320 must also have a non-zero vertical dimension in order to be real; but this non-zero vertical dimension is not large enough to provide meaningful information regarding orientation of target 1300 about the x axis illustrated in FIG. 13A. On the other hand, a specular reflective area as described extends along the planar surface in both a first direction and a second direction perpendicular to the first direction, to indicate orientation of the target about the second axis perpendicular to the first direction and about a third axis perpendicular to the second direction.

Specular reflective areas are not necessarily limited in shape to that shown in FIGS. 17A and 17B. For example, FIG. 18 is a front view of a target 1800 which is similar to target 1700. Description of target 1700 is applicable to target 1800 unless context dictates otherwise. One difference between target 1800 and target 1700 is that in target 1800, specular reflective region 1820 has a circular shape.

In any of target 1700 or target 1800, the two-dimensional specular reflective region can be curved relative to a planar surface of the target, similar to as shown in FIG. 16. For example, in target 1800, specular reflective region 1820 can have or be positioned on a surface of a dome-shape extending out of the page.

Figure 19:
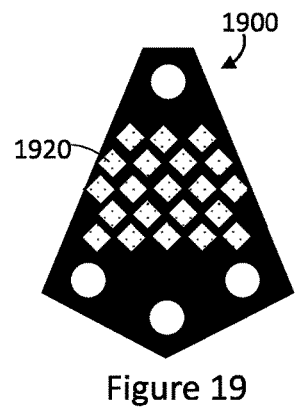
FIG. 19 is a front view of a target similar to that in FIGS. 17A and 17B, comprising a plurality of specular reflective regions.

FIGS. 13A, 13B, 14A-14D, 15A-15C, 16A-16E, 17A, 17B, and 18 show specular reflective regions which are continuous along a target, but this is not necessarily the case. FIG. 19 is a front view of a target 1900, which is similar to target 1700 or target 1800. Description of targets 1700 and 1800 is applicable to target 1900 unless context dictates otherwise. One difference between target 1900 and target 1700 and 1800 is that target 1900 includes a plurality of specular reflective regions 1920 positioned on the target. Identifying an orientation of target 1900 includes identifying from which specular reflective region light is being received (i.e. which specular reflective region of the plurality of specular reflective regions is producing specular reflection).

Similar to as described regarding FIGS. 10 and 11 above, the targets of FIGS. 13A, 13B, 14A-14D, 15A-15C, 16A-16E, 17A, 17B, 18, and 19 can comprise a cartridge insertable into a mask unit. The mask unit comprises a set of regions (such as regions 1312 or 1314), and the mask unit covers select regions of the cartridge to define another set of regions (such as the other of regions 1312 or 1314) as uncovered regions of the cartridge.

Figure 20:
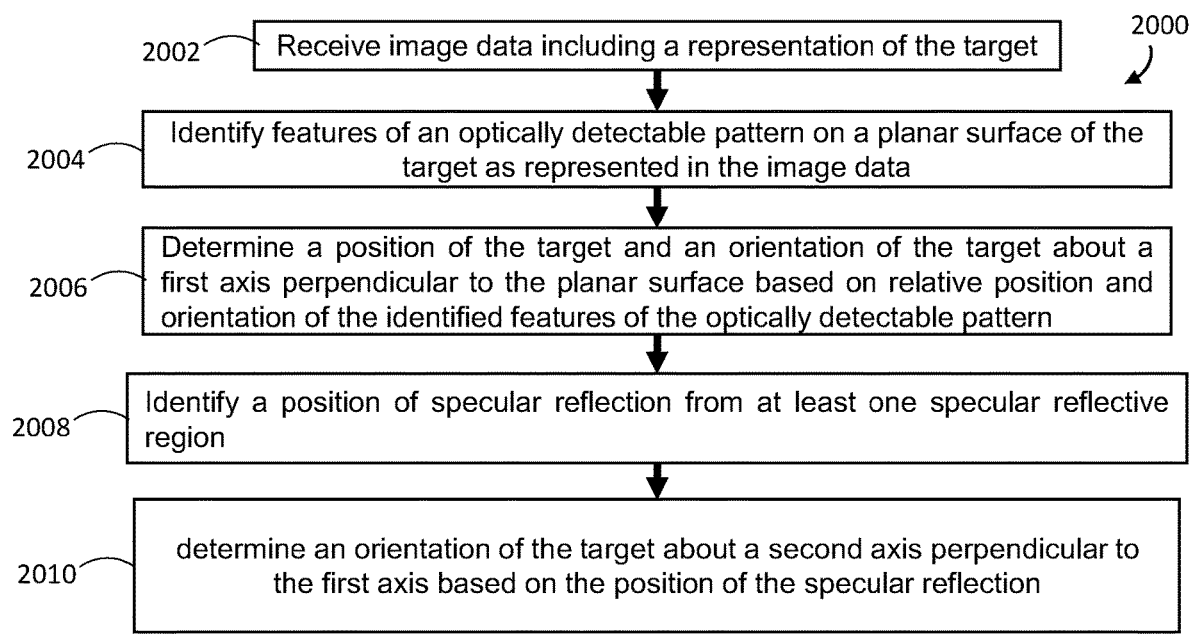
FIG. 20 is a flowchart diagram of a method for using the targets of FIGS. 13A, 13B, 14A-14D, 15A-15C, 16, 17A, 17B, 18, and 19.

FIG. 20 is a flowchart diagram which illustrates a computer implemented method 2000 for tracking any of the targets described with reference to FIGS. 13A, 13B, 14A-14D, 15A-15C, 16A-16E, 17A, 17B, 18, and 19. Method 2000 can be performed by a tracking system, such as that described with reference to FIG. 1. In particular, processing acts are performed by a processing unit of such a tracking system, such as a processing unit in computing device 132. FIG. 20 includes at least acts 2002, 2004, 2006, 2008, and 2010; additional acts could be added, or acts could be removed or rearranged, as appropriate for a given application.

In act 2002, image data including a representation of the target is received. For example, an image sensor of a tracking system can capture image data, and provide this image data to a processing unit of the tracking system.

In act 2004, features of an optically detectable pattern on a planar surface of the target as represented in the image data are identified. For example, for targets where the optically detectable pattern is a plurality of circles, dots, lines, or other shapes (as shown in FIGS. 13A, 13B, 15A-15C, 16A-16E, 17A, 17B, 18, and 19), the relative positions of these shapes is identified. Optionally, prior to identifying features of an optically detectable pattern, image binarization can be performed to convert the image to only represent "bright" regions and "dark" regions based on a brightness threshold, and detection is performed based on boundaries between the bright and dark regions. Also optionally, processing speed and accuracy can be improved by filtering feature candidates by only performing feature detection in regions where features are expected to be, based on the optically detectable pattern being known to the tracking system. For example, if certain features are identified (such as fiducials on the target or a small number of shapes), expected locations of the remaining features can be predicted and only these predicted locations can be processed.

In act 2006, a position of the target in space, and an orientation of the target about a first axis perpendicular to the planar surface are determined based on the relative position and orientation of the identified features of the optically detectable pattern. For example, with reference to target 1300 in FIGS. 13A and 13B, the location of the plurality of circles is used to identify the position of the target in space, and to identify an orientation of the target about the z axis.

In act 2008, a position of specular reflection from the at least one specular reflective region is identified. Optionally, processing speed and accuracy can be improved by limiting processing to a region where the specular reflective region is expected to be, based on a known geometry of the target. Identified features of the optically detectable pattern can be used to determine an expected position of the specular reflective region, and only the image data corresponding to the expected position can be analyzed to identify a position of specular reflection. For example, a processing unit of the tracking system can perform brightness detection to identify a peak intensity of light along a region where the specular reflective region is expected to be, to identify a center of the specular reflection.

In act 2010, an orientation of the target about a second axis perpendicular to the first axis is determined based on the position of the specular reflection. For example, with reference to FIGS. 14A-14D and 15A-15C, a processing unit of the tracking system determines an orientation of the target about the x axis or the y axis based on a position of the specular reflection as discussed above.

Optionally, when the specular reflective region comprises first and second specular reflective regions collectively extending along the planar surface of a target in a first direction and a second direction, as in FIGS. 16D and 16E, an orientation of the target about the second axis is determined based on determining position of the specular reflection along the first specular reflective region in said first direction, and orientation about a third axis non-parallel to the second axis is determined based on determining position of specular reflection along said second spectral reflective region in said second direction. For example, with reference to target 1650 in FIGS. 16D and 16E, a processing unit of the tracking system determines an orientation of the target about the x axis by determining a position of the specular reflection 1692 in the vertical direction, and determines an orientation of the target about the y axis by determining a position of the specular reflection 1690 in the horizontal direction. In some implementations, this act could be included in act 2010.

Optionally, when the specular reflective region comprises a specular reflective area extending along the planar surface of a target in a first direction and a second direction, an orientation of the target about the second axis is determined based on determining position of the specular reflection in said first direction, and orientation about a third axis non-parallel to the second axis is determined based on determining position of the specular reflection in said second direction. For example, with reference to target 1700 in FIGS. 17A and 17B, a processing unit of the tracking system determines an orientation of the target about the x axis by determining a position of the specular reflection 1794 in the vertical direction, and determines an orientation of the target about the y axis by determining a position of the specular reflection 1794 in the horizontal direction. In some implementations, this act could be included in act 2010.

In targets such as target 1900 in FIG. 19, where the at least one specular reflective region comprises a plurality of specular reflective regions, positioned along the planar surface, determining an orientation of the target about a second axis (or determining an orientation of the target about a third axis) comprises determining an orientation of the target about the second axis based on which specular reflective region of the plurality of specular reflective regions is producing specular reflection.

With reference again to FIG. 1, an optical tracking system is described, in which any of the targets described with reference to FIGS. 13A, 13B, 14A-14D, 15A-15C, 16, 17A, 17B, 18, or 19 can be used as target 112 or target 114. The optical tracking system further includes an image sensor (image sensor 122 in FIG. 1) paired with a light source, and a processing unit (such as a processor in computing device 132 in FIG. 1). In use, the light source illuminates the target 112 or target 114, and the image sensor captures image data including at least one representation of target 112 or target 114. Such image data can be a still image, or multiple images, such as a video stream. The captured image data is directed from image sensor 122 to the processing unit (for example by a direct connection or over a network). The processing unit receives the image data, and determines a pose of the target based on the captured image data, such as according to method 2000 in FIG. 20. In some implementations, in acts of identification of patterns, features, or shapes of elements of a target, the processing unit compares the position of patterns, features, or shapes of the target represented in the image data to positions of the patterns, features, or shapes in a model of the target. For example, a CAD or computer model of the target could be accessed by the processing unit, the model having a geometry which matches a known geometry of the target. In other examples, the model could be a simplified model which indicates relative orientation and position of important patterns, features, or shapes, and a key point of the target (such as the tip of an extension from the target, or a centroid of the target).

The targets described herein are illustrated as having a kite-like shape when viewed from the front. This shape is merely exemplary, and any appropriate shape could be implemented as appropriate for a given implementation, such as a circular, oblong, square, rectangular, pentagonal, hexagonal, or any other shape.

In some implementations, the tracking system includes a non-transitory processor-readable storage medium which stores instructions thereon. When executed, said instructions cause the processing unit to perform the actions described above. In other implementations, the processing unit comprises a logic circuit or similar which can perform processing operations without needing to read instructions from a medium.

The various computing devices shown herein can comprise a processing unit (for example a microprocessor, field programmable gate array (FPGA), application specific integrated circuit (ASIC), logic controller, or any other appropriate processing hardware), a storage device (e.g. non-transitory processor-readable storage medium, such as memory, RAM, ROM, magnetic-disk, solid state storage, or any other appropriate storage hardware) storing instructions which when and executed by the processing unit configure the computing device to perform operations for example to provide the functionality and features described herein. Computer program code for carrying out operations may be written in any combination of one or more programming languages, e.g., an object oriented programming language such as Java, Smalltalk, C++ or the like, or a conventional procedural programming language, such as the "C" programming language or similar programming languages.

Any of the computing devices may have communication subsystems to communicate via a network. Any may have a display device and other input and/or output devices.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise", "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

The invention claimed is:

1. A computer implemented method of tracking a target, the target having a planar surface with an optically detectable pattern thereon, and at least one optically detectable protrusion extending from the planar surface, the method comprising:
   receiving image data including a representation of the target;
   identifying the optically detectable pattern on the planar surface as represented in the image data;
   identifying a shape of the at least one protrusion as represented in the image data;
   determining a position of the target and an orientation of the target about a first axis perpendicular to the planar surface based on relative position and orientation of the identified optically detectable pattern; and
   determining an orientation of the target about a second axis perpendicular to the first axis based on the shape of the at least one protrusion as represented in the image data.

2. The method of claim 1, wherein the optically detectable pattern on the planar surface includes a plurality of lines which run along the planar surface, and wherein identifying the optically detectable pattern on the planar surface comprises performing line detection to at least partially identify the plurality of lines.

3. The method of claim 2, further comprising determining intersection points between identified lines, and wherein determining the position of the target and the orientation of the target about the first axis includes determining the position of the target and the orientation of the target about the first axis based on a relative position and orientation of the intersection points.

4. The method of claim 2, wherein performing line detection comprises one or both of:
   filtering identified line candidates based on expected line position; and
   performing a Standard Hough Transform (SHT).

5. The method of claim 1, wherein the at least one protrusion includes at least two protrusions, and wherein determining the orientation of the target about the second axis is based on the shape of at least one protrusion of the at least two protrusions as represented in the image data.

6. The method of claim 5, wherein each protrusion of the at least two protrusions extends from the planar surface to a different extent, and wherein determining the orientation of the target about the second axis is based on:
   the shape of a first protrusion of the at least two protrusions as represented in the image data when the orientation of the target about the second axis is within a first angular range; or
   the shape of a second protrusion of the at least two protrusions as represented in the image data when the orientation of the target about the second axis is within a second angular range different from the first angular range.

7. The method of claim 1, wherein each protrusion of the at least one protrusion includes a respective tip at an end of thereof distal from the planar surface, the tip having a larger diameter than a diameter of the respective protrusion, and wherein determining the orientation of the target about the second axis is based on a position or shape of at least one respective tip as represented in the image data.

8. The method of claim 1, wherein determining the orientation of the target about the second axis perpendicular to the first axis comprises comparing the shape of the at least one protrusion as represented in the image data to a known geometry of the at least one protrusion.

9. The method of claim 1, wherein identifying the shape of the at least one protrusion as represented in the image data comprises performing edge detection to identify a boundary of the protrusion as represented in the image data.

10. The method of claim 1, further comprising, prior to identifying the optically detectable pattern, performing binarization of the image data to identify bright regions and dark regions in the image data based on a brightness threshold.

11. The method of claim 1, further comprising determining an orientation of the target about a third axis perpendicular to the first axis and non-parallel to the first axis based on the shape of the at least one protrusion as represented in the image data.

12. The method of claim 1, wherein determining the orientation of the target about the second axis perpendicular to the first axis based on a shape of the at least one protrusion as represented in the image data comprises determining an orientation of the target about the second axis based on a shape of a portion of the planar surface occluded by the at least one protrusion.

13. An optical tracking system comprising:
   a target, the target including:
   a planar surface having an optically detectable pattern thereon; and
   at least one optically detectable protrusion extending from the planar surface;
   an image sensor to capture image data including at least one representation of the target; and
   a processing unit to:
     receive the image data from the image sensor;
     identify the optically detectable pattern on the planar surface as represented in the image data;
     identify a shape of the at least one protrusion as represented in the image data;
     determine a position of the target and an orientation of the target about a first axis perpendicular to the planar surface based on relative position and orientation of the identified optically detectable pattern; and determine an orientation of the target about a second axis perpendicular to the first axis based on the shape of the at least one protrusion as represented in the image data.

14. The optical tracking system of claim 13, wherein the optically detectable pattern on the planar surface includes a plurality of lines which run along the planar surface, and wherein to identify the optically detectable pattern on the planar surface comprises performing line detection to at least partially identify the plurality of lines.

15. The optical tracking system of claim 14, wherein the processing unit further operates to determine intersection points between identified lines, and wherein to determine the position of the target and the orientation of the target about the first axis includes determining the position of the target and the orientation of the target about the first axis based on relative position and orientation of the intersection points.

16. The optical tracking system of claim 14, wherein performing line detection comprises at least one of:
   filtering identified line candidates based on expected line position; and
   performing a Standard Hough Transform (SHT).

17. The optical tracking system of claim 13, wherein the at least one protrusion includes at least two protrusions, and wherein determining an orientation of the target about the second axis is based on the shape of at least one protrusion of the at least two protrusions as represented in the image data.

18. The optical tracking system of claim 13, wherein each protrusion of the at least one protrusion includes a respective tip at an end of thereof distal from the planar surface, the tip having a larger diameter than a diameter of the respective protrusion, and wherein to determine the orientation of the target about the second axis is based on a position or shape of at least one respective tip as represented in the image data.

19. The optical tracking system of claim 13, wherein:
   to determine the orientation of the target about the second axis perpendicular to the first axis comprises comparing the shape of the at least one protrusion as represented in the image data to a known geometry of the at least one protrusion; and
   to identify a shape of the at least one protrusion as represented in the image data comprises performing edge detection to identify a boundary of the protrusion as represented in the image data.

20. The optical tracking system of claim 13, wherein the processing unit further operates to determine an orientation of the target about a third axis perpendicular to the first axis and non-parallel to the first axis based on the shape of the at least one protrusion as represented in the image data.

* * * * *